Feb. 26, 1952　　　P. J. SUNDHEIM　　　2,587,072
SANDER FOR AUTOMOTIVE VEHICLES
Filed Feb. 10, 1950　　　　　　　　　2 SHEETS—SHEET 1
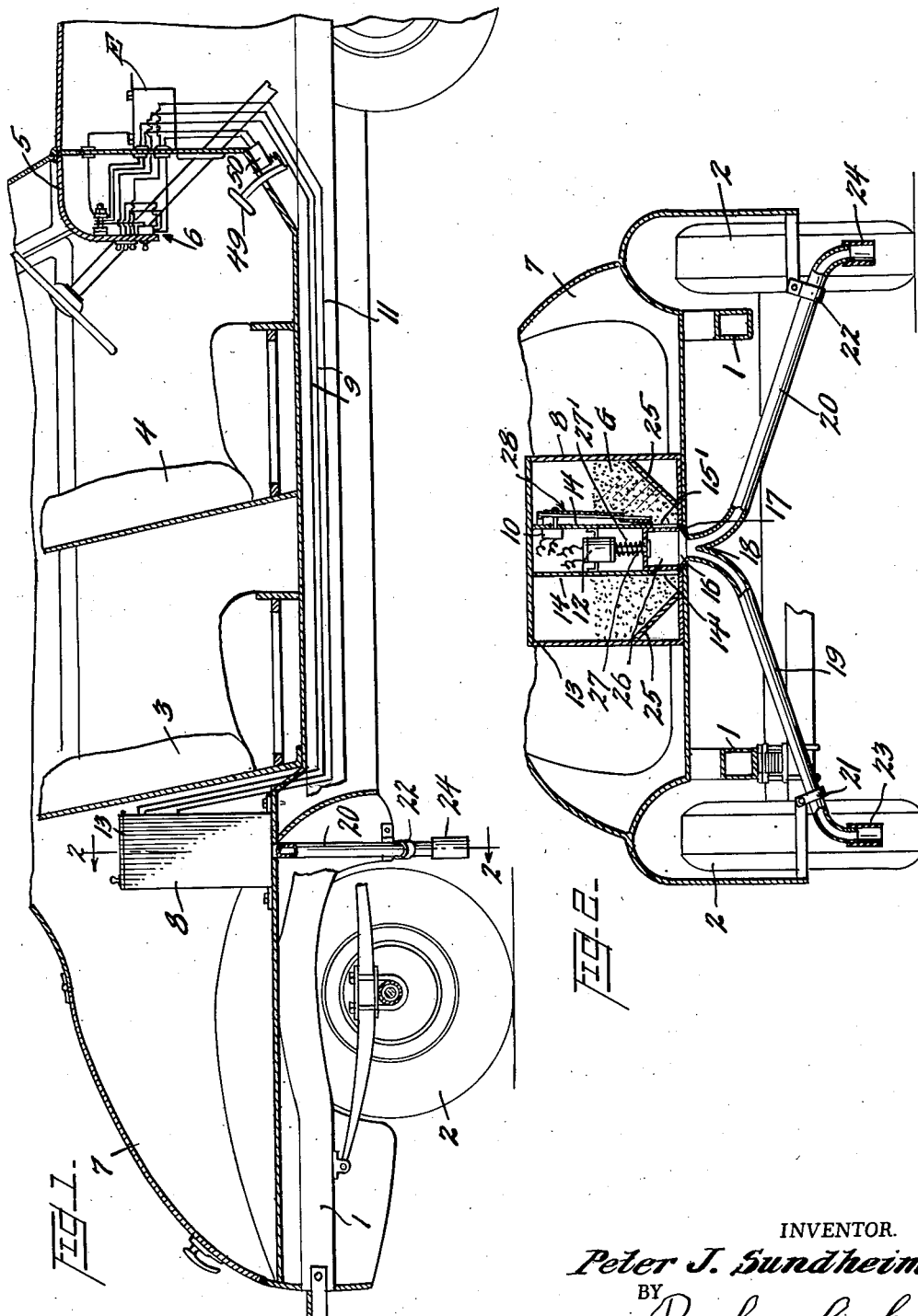
INVENTOR.
Peter J. Sundheim,
BY Parker Cook
ATTORNEY

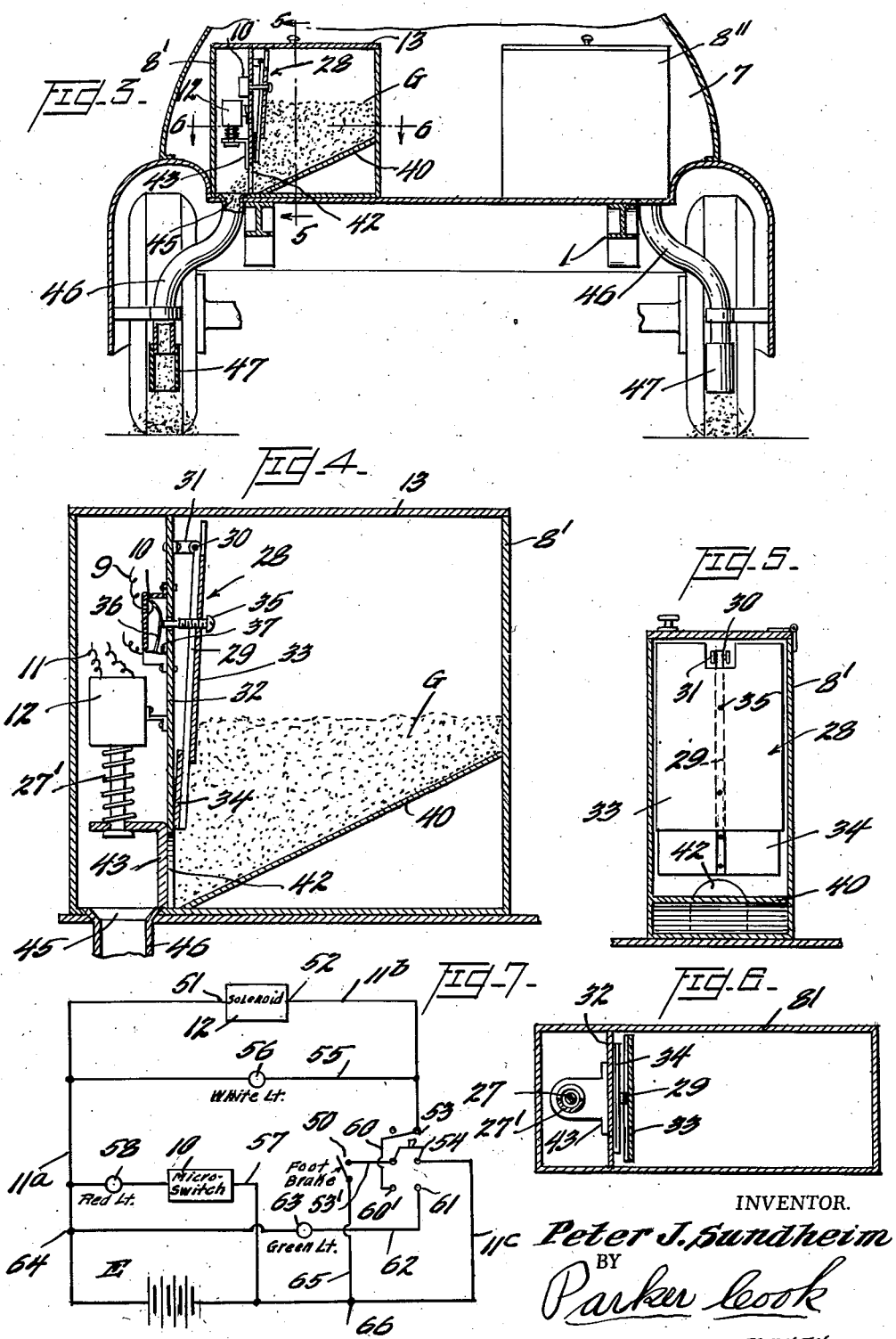

Patented Feb. 26, 1952

2,587,072

UNITED STATES PATENT OFFICE 2,587,072

SANDER FOR AUTOMOTIVE VEHICLES

Peter J. Sundheim, Buffalo, N. Y.

Application February 10, 1950, Serial No. 143,450

2 Claims. (Cl. 291—34)

My invention relates to new and useful improvements in a road sander for automotive vehicles, and especially for a sander for passenger vehicles.

One of the objects of the invention is to provide a sander having a storage bin, preferably located in the trunk compartment or the baggage compartment in the rear of the vehicle, so that sand or grit may be distributed in a relatively short path directly in front of the rear wheels of the vehicle.

Still another object of the invention is to provide a sander wherein the storage bin may be built into the new cars when manufactured, which bin will be directly behind the upright of the rear seat.

Still another object of the invention is to provide a sander wherein the controls are located on the dashboard for easy access to the driver; and wherein the sand may be distributed continually, or, every time the foot brake is applied.

Still another object of the invention is to provide a sander that is compact and efficient, so that the sand or grit may be distributed directly in front of the rear wheels and thus prevent skidding on icy streets, or assist in stopping or starting the car.

Still another object of the invention is to provide a sander with electric controls; and to provide lamps in the form of signals on the dash, so that the operator can tell whether the sand is being distributed, and if so continually, or by the applying of the foot brake, and also whether the storage bin needs replenishing.

With these and other objects in view, the invention consists in certain new and useful improvements and combination of parts as will be hereinafter more fully described and pointed out in the claims.

Referring now to the drawings, showing a preferred form and one modification,

Fig. 1 is a longitudinal section through an automobile, showing my invention applied thereto, Fig. 2 is a cross-section on line 2—2 of Fig. 1, Fig. 3 is a view similar to Fig. 2 but of a modified form, that is, with two separate storage bins for holding the grit or sand, Fig. 4 is a vertical sectional view through one of the bins, similar to Fig. 3, but on an enlarged scale, Fig. 5 is a sectional view taken on line 5—5 of Fig. 3, Fig. 6 is an enlarged sectional view on line 6—6 of Fig. 3, and Fig. 7 is a view showing a preferable wiring diagram for the operation of the storage bins.

Referring now for the moment to Fig. 1, which is a fragmentary sectional view of a passenger automobile with a chassis frame 1 and the rear wheels 2, the rear seat 3, forward seat 4, and the dashboard 5 on which is mounted the electrical control box 6, to be hereinafter mentioned.

Behind the rear seat 3 and located in the trunk or storage compartment 7 may be seen a storage bin 8; and from this storage bin 8 may be seen the lead-in wires 9 to a micro-switch 10, hereafter to be fully described, and the lead-in wires 11 that connect with a solenoid 12, also to be mentioned shortly.

Referring now to Figs. 1 and 2, and to the storage bin 8, it will be understood that it may be of any desired height, width and length, and is provided with a hinged cover 13, so that this storage bin 8 may be filled with sand or grit G. I preferably use a sharp sand, that is, covered with a tar or asphaltum, or any similar substance, so that the sand will not absorb moisture and thus will flow more freely when the solenoid-operated gate, also hereafter to be mentioned, is raised.

The tank or storage bin 8 may, if desired, be divided into two main parts by partition walls 14, and near the bottom thereof there are the respective openings 14' and 15' which will permit the sand or grit G to flow through the opening 16 in the bottom of the storage bin 8 and the opening 17 in the floor into a bifurcated coupling 18, from one arm of which leads the tube 19 and from the other arm of which leads the tube 20.

Now, these tubes 19 and 20 are supported from part of the chassis frame 1 as at 21 and 22; and each tube has a small rubber hose portion 23 and 24 that hangs directly in front of the wheels 2, as may be seen in Figs. 1 and 2.

It will also be noticed that the storage bin 8 has the slanting bottom 25, so that the grit G in each division of the storage bin 8 will flow to the openings 14' and 15' in the walls 14 and 15.

Now, acting as a gate in front of the openings 14' and 15' is the box-like in cross-section gate 26 (but without a bottom); and in the upper portion of the plate or gate 26 is fastened a plunger 27 of the solenoid 12 heretofore mentioned. Thus, when the solenoid 12 is energized, the gate 26 will be elevated to let the grit G flow through the aforementioned openings 14' and 15' through the tubes 19 and 20 and out in front of the rear wheels 2. When the solenoid 12 is de-energized, the weight of the gate 26 will cause it to drop by gravity and cut off the flow of the grit G, as is well understood.

However, I may employ a small spring 27' about the plunger 27, interposed between the top of the gate 43 (Fig. 6) and the bottom of the solenoid 12 to assist in the closing of the gate 43. This would also apply, of course, to the solenoid 12 for raising and lowering the gate 26 (Fig. 2).

Also mounted in the storage bin 8 is what might be termed a "tell-tale" apparatus 28 for signalling the driver when the storage bin 8 is empty. This is the same in the modified form as used in the form just described. Therefore, reference is made to Figs. 4, 5, and 6, which show the tell-tale apparatus 28 and micro-switch 10 more clearly, as these are enlarged sectional views.

This tell-tale 28 consists preferably of an aluminum rod 29, which is pivoted as at 30 within the storage bin 8' to bracket 31, which bracket 31 extends out a short distance from the wall 32 of the storage bin 8'. To this rod 29 there is affixed a relatively wide piece of fibre or metal 33, and near the lower end is a like or similar piece 34. There is also an adjusting screw 35 that passes through the rod 29 and also passes through the wall 32 and is used to operate the micro-switch 10. This micro-switch 10 has the spring-arm 36 and cooperates with the switch point 37 to close an electric circuit through the heretofore mentioned lead-wires 9 when the bin 8' is nearly empty.

It will be seen that when the storage bin 8' is filled or partly filled with the grit G, it will press against the two fibre boards 33 and 34 and the adjusting screw 35 push the spring-arm 36 away from its contact point 37 and thus provide an open circuit with respect to this micro-switch 10. However, when the grit G gets below the fibre board 34, which, is mounted on the swinging arm 29, the arm 29 will swing to the vertical and thus allow the spring-arm 36 of the micro-switch 10 to contact with its point 37 to close the circuit, which in turn lights a red lamp on the dashboard 5, which will be explained when the wiring diagram is referred to.

It will be understood that whether there is one storage bin 8, or two, as shown in the modified form in Fig. 3, it will only be necessary to have one tell-tale apparatus 28, as these bins will be operated in unison, although if desired two tell-tale apparatuses and two micro-switches can be used.

Referring now to the modified form, the electrical operation is identical, but in this form, rather than having one storage bin 8 with a bifurcated coupling 18 at its bottom to distribute the grit G in front of the wheels 2, I provide two storage bins 8' and 8", and a description of one bin will be a description of both.

In this form, the storage bin 8' has a false bottom 40 and the wall 32 with the opening 42 therein, in front of which opening 42 is the right-angle shaped gate 43 which is operated by the solenoid 12; and the grit G will flow through the opening 45 into the tube or conductor 46 and then into the flexible end piece of hose 47 in front of the rear wheels 2. This is duplicated on the other side of the car, the material or grit G flowing from the bin 8" when its solenoid is operated. Of course, there is the tell-tale apparatus 28 just described and the micro-switch 10.

It will be understood that the only difference here from the preferred form is that there are two tanks or storage bins, each having its own solenoid, rather than having one tank or storage bin with one solenoid, to which latter is fastened the double form of gate to discharge the material or grit G from the opposite sides of the storage bins.

The electrical connections are the same as in the preferred form, with the one difference, that there will be two solenoids in the circuit instead of one; and two micro-switches, if desired, instead of one.

Referring now to Fig. 7, I have shown a wiring diagram for the operation of the preferred form, that is, where there is just one storage bin illustrated; but, it will be understood that the only difference between the electrical wiring diagram for the two storage bins would be to put another solenoid in the circuit, which is so obvious it has not been illustrated.

It will be understood that the sander is automatic, that is, automatic in that when the switch is thrown in one position, as well shortly be mentioned, the grit G will be discharged until the switch is opened, and a certain signal will flash, whereas if the switch is thrown in the opposite direction, the grit G will only be discharged when the foot pedal is depressed and certain signals will be flashed to the driver.

Referring to Fig. 1, for the moment, there will be noticed the conventional foot pedal 49, which when depressed closes a switch 40 which switch 50 may be seen in the wiring diagram in Fig. 7.

Having explained the several forms of storage bins and their position, as well as the manner of providing a discharge opening with a gate to be operated by a solenoid, reference is now made to the wiring diagram shown in Fig. 7.

There will be noticed the electric battery E, and the lead wires 11, heretofore mentioned, which lead to the solenoid 12. One of the wires 11a leads to one side of the solenoid 12 and is connected as at 51, while the other lead wire 11b is connected to the solenoid 12 as at the point 52, and then runs to a switch post 53.

There will be noticed in the wiring diagram a modified double-pole, double-throw switch 54; and when the same is thrown upwardly, the circuit will be completed thru the wires 11a, 11b and 11c back to the other side of the battery E.

Also there is a small shunt circuit 55 in which there is a white lamp 56, this shunt circuit 55 being connected between the wires 11a and 11b, as may readily be seen. Thus, when the double-pole, double-throw switch 54 is thrown upwardly, as viewed from Fig. 7, the solenoid 12 is energized, and the white lamp 56 is lit, which lamp 56 is mounted on the box 6, in which is also mounted the double-pole, double-throw switch 54.

Thus, when the operator throws the double-pole, double-throw switch 54 to the right, the solenoid 12 will be energized to elevate the gate 26; and the grit G will continue to discharge through the conductors 18 and 19 and in front of the rear wheels 2 until the switch 54 is again opened.

Of course, the operation is the same whether one storage bin is used, or two, only if two storage bins are used, there would be another solenoid in the circuit.

It will also be seen that the micro-switch 10 is in a shunt circuit 57 which is connected, as may be seen, on the opposite side of the battery E; and in this circuit 57 is also the red lamp 58 which is also mounted in the box 6 on the dashboard 5 holding the double-pole, double-throw switch 54, so that when the tell-tale apparatus 28 swings inwardly, as viewed from Fig. 6, this small switch 36 will close the shunt circuit 57 and cause the red light 58 to show in the switch box 6.

Still glancing at the wiring diagram, and at the double-pole, double-throw switch 54, it will be noticed that I lead a wire or jumper 60 for the post 60' to the aforementioned binding post 53, connected to the lead wire 11b; while from the post 61 of the double-pole, double-throw switch 54 I lead the wire 62 to a green light 63, and then connect this wire 62 to the wire 11a at the point 64.

It will also be noticed that there is a lead wire 65 that connects at 66 to the wire 11c which leads to the foot brake switch 59. Thus, when the double-pole, double-throw switch 54 is thrown down (Fig. 7), there is a completed circuit through 11c, the double-pole, double-throw switch 54, and the wire 62 and the green lamp 63 back to the battery E, so that when the switch 54 is in this position the green light 63 is lit.

Also, when the foot pedal 49 is depressed, the circuit is also completed from one side of the battery E through the wire 11a, through the solenoid 12, the wire 11b, and then from the post 53 through the jumper 60, through the post 60' of the double-pole, double-throw switch 54, and through the lead 53' through the foot pedal switch 59 and the wire 65 that, it will be remembered, is connected as at 66 to the lead wire 11c, thus completing the circuit.

Also, the white light 56 in the shunt circuit 55 will light only while the foot pedal 49 is depressed. It will be remembered that the solenoid 12 is in this circuit, as well as the white light 56; and, as heretofore mentioned, the green light 63 is lit, so that every time the foot pedal 49 is depressed, the solenoid 12 is energized to raise its gate 26 to discharge G; but the solenoid 12 will be deenergized the moment the foot pedal 49 is released, thus de-energizing the solenoid 12 and cutting off the flow of the grit G to the front of the rear wheels 2.

Thus, as long as the double-pole, double-throw switch 54 is in its lower position (Fig. 7) the green light 63 will remain lit, but the solenoid 12 will only operate and the white light 56 will only be lit as long as the foot pedal 49 is depressed.

To recapitulate, when the double-pole, double-throw switch 54 is thrown in the one direction, as to the top, the white light 56 continues to burn, and the solenoid 12 will hold the gate 26, or the gate 43 in the modified form, in its open position until the switch 54 is thrown back to it neutral position; whereas, if the double-pole, double-throw switch 54 is thrown in the opposite direction, the green light 63 remains lit and the solenoid 12 is energized and the white light 56 flashed on each depression or operation of the foot pedal 49.

By this means the driver can tell whether he has a continual flow of grit G or whether he has thrown the switch 54 to the opposite direction, so that the grit G will only be discharged when the foot pedal 49 is depressed.

It will be understood that this sander is to be used where the roads or streets are slippery or icy, and it will assist in the starting or stopping of the car, or preventing the same, at times, from skidding.

It will also be appreciated that it is to function with icy or slippery streets rather than streets covered with deep snow.

From the foregoing, it will be seen that I have provided a sander wherein a single or double storage bin may be used; and wherein the sander may be installed in cars already in use, or will be fitted in new cars in the factory; and it will further be seen that the operation is automatic, in that it only takes the operation of a switch on the dashboard and/or the use of the foot pedal when the brake is applied.

I have found that the sander is one that greatly assists in safe driving on slippery streets and one that is relatively cheap to manufacture and install.

It will be understood that the sander may be built of different sizes, depending on how much space there is for the storage bin; and might equally be well applied to trucks, buses, or even motorcycles.

Many slight changes might be made without departing from the spirit and scope of the invention.

Having thus described the same, what I claim is new and desire to secure my Letters Patent is:

1. In a sander for automotive vehicles, a storage bin having a discharge opening therein, sand-conducting means leading from the discharge opening to in front of the rear wheels of the motor vehicle; a solenoid having a gate attached thereto and the gate positioned in front of the said discharge opening; an electric circuit, including the said solenoid; a dashboard switch in said circuit, whereby a closing of said switch will energize the said solenoid to thus raise the gate and permit a flow of the sand to in front of the rear wheels of the vehicle; a further electric circuit, including a brake pedal switch to close the last-mentioned circuit and energize the solenoid to in turn operate the gate and thus permit a flowing of the sand, but only as long as said brake pedal switch is depressed; a shunt circuit in said first-mentioned electric circuit and a signal light therein to show when the solenoid is energized; and a further circuit and an arm-operated switch, said arm mounted in said storage bin and holding the switch open when there is sand in the bin, a signal lamp in said last-mentioned circuit and said arm swinging inwardly to close the said circuit to thus light the signal lamp when said storage bin is empty.

2. In a sander for automotive vehicles, a storage bin having a discharge opening therein, sand-conducting means leading from the discharge opening to in front of the rear wheels of the motor vehicle; a solenoid-operated gate in front of the discharge opening; an electric circuit including said solenoid; a dashboard double-throw switch in said circuit, whereby the throwing of the switch in one direction will energize said solenoid and hold the gate in a raised position to permit a continuous flow of the sand from in front of the rear wheels of the vehicle; and a further electric circuit, including the double-throw switch and also including a brake pedal switch so that when the double-throw switch is thrown in the opposite direction, a depression of the brake pedal switch will close said last-mentioned circuit and also energize the solenoid and raise the gate to permit the flowing of the sand, but only as long as said brake pedal switch is depressed.

PETER J. SUNDHEIM.

REFERENCES CITED

The following references are of record in the file of this patent:

UNITED STATES PATENTS

| Number | Name | Date |
| --- | --- | --- |
| 1,354,570 | Lamping et al. | Oct. 5, 1920 |
| 1,427,535 | Lamping et al. | Aug. 29, 1922 |
| 1,812,521 | Elston | June 30, 1931 |
| 2,212,865 | Kirk | Aug. 27, 1940 |

FOREIGN PATENTS

| Number | Country | Date |
| --- | --- | --- |
| 31,535 | Switzerland | June 21, 1904 |